(12) United States Patent
Oruganti et al.

(10) Patent No.: US 12,198,024 B2
(45) Date of Patent: Jan. 14, 2025

(54) CONFIGURING AUTOSAVE TRIGGERS BASED ON VALUE METRICS

(71) Applicant: Oracle International Corporation, Redwood Shores, CA (US)

(72) Inventors: Satish Chandra Oruganti, Bengaluru (IN); Shreyas Ravindranath, Bangalore (IN); Ganesh Kumar Gupta, Bangalore (IN); Michael Patrick Rodgers, Lake Oswego, OR (US)

(73) Assignee: Oracle International Corporation, Redwood Shores, CA (US)

( * ) Notice: Subject to any disclaimer, the term of this patent is extended or adjusted under 35 U.S.C. 154(b) by 917 days.

(21) Appl. No.: 17/319,599

(22) Filed: May 13, 2021

(65) Prior Publication Data

US 2022/0366296 A1    Nov. 17, 2022

(51) Int. Cl.
*G06N 20/00* (2019.01)
*G06F 11/14* (2006.01)
*G06F 18/2113* (2023.01)

(52) U.S. Cl.
CPC ......... *G06N 20/00* (2019.01); *G06F 11/1446* (2013.01); *G06F 11/1471* (2013.01); *G06F 18/2113* (2023.01)

(58) Field of Classification Search
None
See application file for complete search history.

(56) References Cited

U.S. PATENT DOCUMENTS

| 10,599,526 | B2 * | 3/2020 | Milvaney | G06Q 10/101 |
| 2013/0013875 | A1 * | 1/2013 | Brown | G06F 16/16 |
| | | | | 711/E12.103 |
| 2015/0200832 | A1 * | 7/2015 | Kurniady | G06Q 10/101 |
| | | | | 709/224 |

* cited by examiner

*Primary Examiner* — Daniel T Pellett
(74) *Attorney, Agent, or Firm* — Invoke

(57) ABSTRACT

Techniques for configuring autosave triggers in a computing environment based on environment and data conditions are disclosed. A system trains a machine learning model based on data attributes and environmental attributes to generate autosave value triggers for a computing environment. The autosave value triggers are triggered by different conditions. For example, one autosave trigger may be triggered when an error condition is detected. Another may be triggered when a certain number of operations are performed. The machine learning model generates autosave trigger values scores for one or more autosave triggers. The system may implement the autosave triggers in the computing environment based on the autosave trigger values.

21 Claims, 7 Drawing Sheets

CONFIGURING AUTOSAVE TRIGGERS BASED ON VALUE METRICS

TECHNICAL FIELD

The present disclosure relates to configuring autosave triggers in a system based on measured system conditions. In particular, the present disclosure relates to applying a machine learning model to generate a value metric for an autosave trigger based on system conditions. The value metric takes into account a cost of an autosave operation triggered by an autosave trigger and a benefit of the autosave operation to the system. The system determines whether to apply the autosave trigger in the system based on the value metric.

BACKGROUND

Any abrupt end to a software application may lead to the loss of data. The lost data must be re-created by a user, which is a time-consuming process. Often, the data that is lost was generated by the interaction of multiple different operations or functions. As a result, it may be difficult for users to accurately re-create lost data. Autosave operations may be used to prevent the loss of too much data when a software application ends abruptly. Typical autosaves occur at regular intervals. However, a regularly-occurring autosave may not be designed to capture vital information. For example, a regularly-occurring autosave may slow or interrupt a running application, reducing the desirability of the autosave. Alternatively, the regularly-occurring autosave may capture too much or too little data. A need exists for configurable and customizable autosaves to store data based on environment conditions and user requirements.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
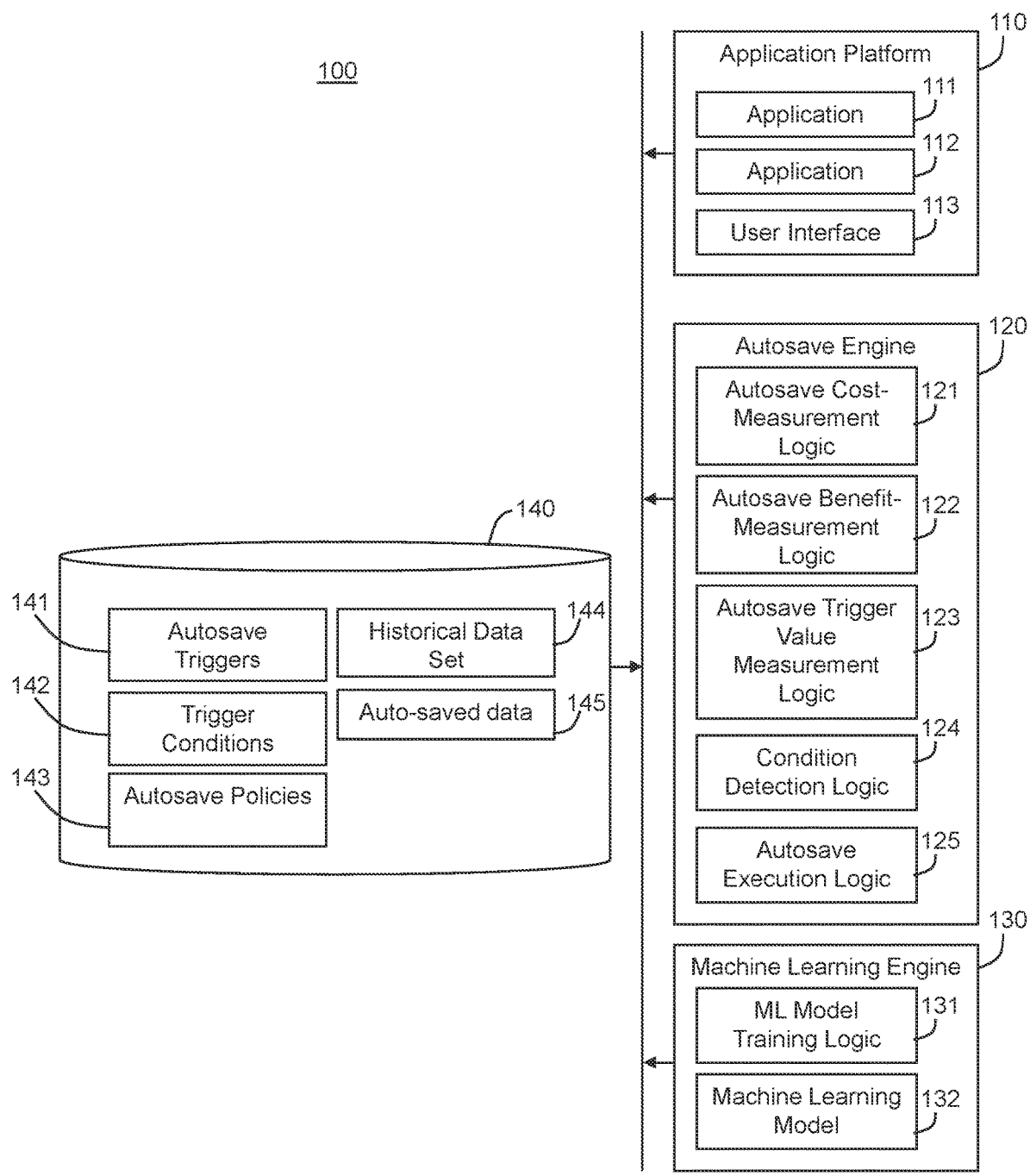
FIG. 1 illustrates a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. General Overview
2. System Architecture
3. Generating Autosave Trigger Values for Autosave Triggers in a Computing Environment
4. Training a Machine Learning Model to Generate an Autosave Value for an Autosave Trigger
5. Applying an Autosave Trigger in a System Based on a Data Vulnerability Score
6. Example Embodiment: Generating Autosave Value Metrics for Autosave Triggers
7. Example Embodiment: Generating an Autosave Data Retention Policy Based on Autosave Trigger Value Scores
8. Computer Networks and Cloud Networks
9. Miscellaneous; Extensions
10. Hardware Overview

1. General Overview

Autosave operations are operations that are executed to save data without receiving specific user input to save the data. A trigger for an autosave operation defines at least one set of conditions which when detected, result in execution of the autosave operations. One or more embodiments generate a value score for a target trigger that triggers a set of autosave operations for saving data. If the value score meets a threshold value, the system may implement the target trigger in the computing environment. If the value score does not meet the threshold value, then the system may refrain from implementing the target trigger in the computing environment.

One or more embodiments implement a machine learning model that generates the value score for an autosave trigger. The machine learning model is trained using training data that defines both (a) conditions associated with each of a set of triggers for autosave operations and (b) value scores associated with each of the set of triggers. The conditions corresponding to a particular trigger may include the conditions defined by that particular trigger or conditions that were detected in relation to a computing environment when the particular trigger triggered autosave operations.

The value score assigned to a particular trigger in the training data may be received as user input, with a user selecting the value score the particular trigger. Alternatively, or in addition, a system may compute the value score for a particular trigger based on, for example, costs and benefits of the autosave operations corresponding to the particular trigger. Costs of autosave operations include time, resources, interruptions/delays of other processes. A cost score for a particular trigger may be based on one or more of: a processing time required to complete a corresponding autosave operation, an amount of computing resources utilized by the corresponding autosave operation, a frequency with which autosave operations are triggered by the particular trigger, a frequency within the autosave operation interrupts or delays other operations, or a duration of time for which the autosave operation interrupts one or more processes implemented in the computing environment. Benefits of autosave operations include, for example, saving of data that was later accessed by a system or user, saving of data that was not saved by any other autosave operations. A benefit score may be based on an access rate for a particular trigger corresponding to an access frequency for data saved by various executions of autosave operations triggered by the particular trigger. The benefit score may be based on one or more of: a total amount of data saved by the autosave operations, an importance of the data saved by the autosave operations, and a vulnerability or likelihood of loss of the data saved by the autosave operations.

In one or more embodiments, the system may compute a value score for a target trigger without the application of a machine learning model. The system may compute the value score for a target trigger for autosave operations based on a cost/benefit analysis, as described above. If the value score meets a threshold value, the system configures the execution of autosave operations whenever conditions, corresponding to the target trigger, are detected.

One or more embodiments implement a machine learning model that computes how susceptible a data set in the computing environment is to a data loss event. A system obtains a historical data set including historical data about: (a) data lost in a data loss event, (2) environmental conditions at the time of the data loss event, (c) characteristics about data saved at the time of the data loss event, and (d) a data vulnerability score associated with a particular set of data in the computing environment. The system trains the machine learning model using the historical data. Upon training the machine learning model, the system provides information about a target data set, such as environmental conditions and data characteristics, to the model. The model generates a data vulnerability score indicating how susceptible the target data set is to data loss. The system may compare the data vulnerability score to a threshold. If the data vulnerability score exceeds the threshold, the system may implement a particular autosave trigger in the computing environment to avoid data loss of the target data set.

In one or more embodiments, the system executes a real-time cost/benefit analysis for an autosave operation. The real-time cost/benefit analysis involves computing at least one of the cost or the benefit based on real-time conditions detected by the system. In an example, the system may compute cost by identifying an effect of autosave operations on a set of applications currently being executed by the system.

One or more embodiments include configuring a system with an autosave data retention policy according to one or both of autosave trigger value scores and a data vulnerability score. For example, the system may identify five different autosave triggers that are active in the system to trigger autosave operations. The system may determine, based on a value of the autosave trigger and a susceptibility of the system to data loss, that autosave data associated with a recurring, time-based autosave may be over-written with each new autosave operation. The system may determine that autosave data associated with an error-based autosave operation—in which data is saved for a state immediately prior to an error, is retained, and not over-written, for thirty days. The system may determine that autosave data generated during detected idle times may be over-written after three autosave operations.

One or more embodiments described in this Specification and/or recited in the claims may not be included in this General Overview section.

2. System Architecture

FIG. 1 illustrates a system 100 in accordance with one or more embodiments. As illustrated in FIG. 1, system 100 includes an application platform 110, an autosave engine 120, and a machine learning engine 130. The system 100 also includes a data repository 140 to store data generated by, and accessed by, the application platform 110, the autosave engine 120, and the machine learning engine 130.

In one or more embodiments, the data repository 140 is any type of storage unit and/or device (e.g., a file system, database, collection of tables, or any other storage mechanism) for storing data. Further, the data repository 140 may include multiple different storage units and/or devices. The multiple different storage units and/or devices may or may not be of the same type or located at the same physical site. Further, the data repository 140 may be implemented or may execute on the same computing system as the application platform 110, the autosave engine 120, and the machine learning engine 130. Alternatively, or additionally, the data repository 140 may be implemented or executed on a computing system separate from the application platform 110, the autosave engine 120, and the machine learning engine 130. The data repository 140 may be communicatively coupled to one or more of the application platform 110, the autosave engine 120, and the machine learning engine 130 via a direct connection or via a network.

Information describing data contained in the data repository 140 may be implemented across any of components within the system 100. However, this information is illustrated within the data repository 140 for purposes of clarity and explanation.

The application platform 110 runs one or more applications 111, 112. The application platform 113 includes a user interface to allow a user to interact with one or more of the application platform 110, the autosave engine 120, and the machine learning engine 130. In one or more embodiments, user interface 113 refers to hardware and/or software configured to facilitate communications between a user and one or more of the application platform 110, the autosave engine 120, and the machine learning engine 130. Interface 113 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of interface 113 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, interface 113 is specified in one or more other languages, such as Java, C, or C++.

The autosave engine 120 includes autosave cost-measurement logic 121. The cost-measurement logic 121 analyzes conditions within the system 100 or within another system to determine costs associated with autosave triggers 141.

Examples of costs associated with autosave triggers include: (a) a processing time required to complete an autosave operation, (b) an amount of computing resources utilized by the autosave operation, (c) a frequency of the autosave operation, or (d) a duration of time for which the autosave operation interrupts one or more processes implemented in the computing environment. For example, the autosave cost-measurement logic 121 may determine that performing a particular autosave operation associated with a particular autosave trigger may consume a particular percentage of a CPU's processing bandwidth, may result in a particular amount to data storage utilized, and may interrupt operation of the application 112 for ten seconds.

Autosave benefit-measurement logic 122 analyzes conditions within the system 100 or within another system to determine benefits associated with autosave triggers 141. Examples of benefits associated with autosave triggers include: (a) an access rate of an autosave trigger, or a ratio between a number of times the particular trigger is triggered to save data and a number of times the data saved as a result of the particular trigger is accessed to restore the data, (b) an amount of unique data saved by the autosave trigger that would not be saved by another autosave trigger, (c) a total amount of data saved by an autosave trigger, (d) an importance of the data saved by the autosave trigger, and (e) a vulnerability of the saved data to a data loss. For example, the autosave benefit-measurement logic 122 may determine that performing a particular autosave operation associated with a particular autosave trigger may have a relatively high access rate compared to other autosave triggers, may store a small amount of total data, and the data stored has a high vulnerability to data loss based on the system environment characteristics.

Autosave trigger value measurement logic 123 identifies a value of a particular autosave trigger based on the cost metric value and the benefit metric value of the particular autosave trigger. In one embodiment, a user may identify weights for particular costs and particular benefits, and the autosave trigger value measurement logic 123 may generate an autosave trigger value based on the user-identified weights, the conditions that trigger the autosave, and the conditions present in the computing environment.

The autosave engine 120 includes condition detection logic 124 that detects conditions in the computing environment to determine whether the conditions correspond to autosave trigger conditions 142. When the conditions match, autosave execution logic 125 triggers an autosave operation to save data 145 specified by a particular autosave trigger 141. In one or more embodiments, a user may also generate autosave policies 143 specifying which autosave triggers 141 will be applied in the system and which autosave triggers 141 will not be applied.

A machine learning engine 130 receives a historical data set 144 to train a machine learning model 132 using machine learning model training logic 131. In one embodiment, the machine learning model training logic 131 includes a neural network comprising an input layer, an output layer, and one or more hidden layers. The machine learning model training logic 131 trains parameters of the machine learning model 132 based on the historical data set 144 to generate values associated with a computing environment from which the historical data set 144 was obtained. In one embodiment, the machine learning model 132 is configured to receive as an input a data point representing a particular autosave trigger 141 and the conditions 142 associated with the autosave trigger 141. The model 132 generates an autosave trigger value score for the particular trigger 141, representing a value of the trigger 141 in the computing environment. In another embodiment, a machine learning model 132 is trained to generate a data vulnerability score associated with particular a particular set of data. The data vulnerability score represents a likelihood that the particular set of data will be lost in a data loss event.

In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

Additional embodiments and/or examples relating to computer networks are described below in Section 8, titled "Computer Networks and Cloud Networks."

In one or more embodiments, the application platform 110, the autosave engine 120, and the machine learning engine 130 refer to hardware and/or software configured to perform operations described herein for configuring autosave triggers in a system based on measured system conditions. Examples of operations for using a machine learning model to generate autosave trigger value scores based on autosave trigger conditions are described below with reference to FIG. 2.

In an embodiment, one or more of the application platform 110, the autosave engine 120, and the machine learning engine 130 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

Figure 2:
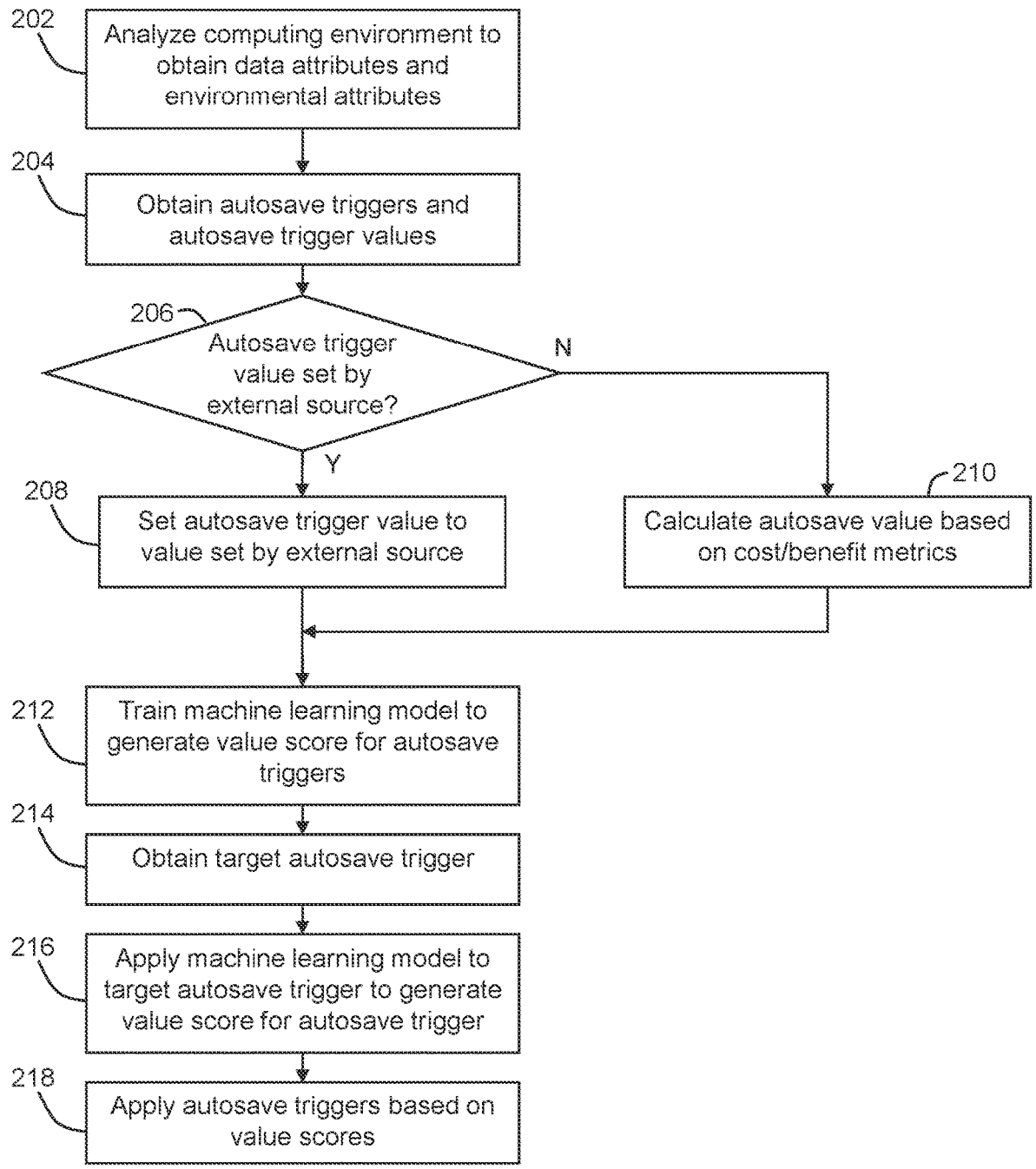
FIG. 2 illustrates an example set of operations for applying autosave triggers in a system in accordance with one or more embodiments.

3. Generating Autosave Trigger Values for Autosave Triggers in a Computing Environment FIG. 2 illustrates an example set of operations for generating autosave value metrics for autosave triggers in accordance with one or more embodiments.

A system analyzes data describing attributes of a computing environment to obtain data attributes and environmental attributes (Operation 202). The data attributes include, for example: types of data, whether data is accessed frequently or seldom, where data is stored, which applications generate data, whether a data loss event occurred, what were the environment and data conditions during the data loss event, and how much and what types of data are saved/lost in association with data loss events. Environmental attributes include, for example: power levels of components in the computing environment, temperature levels in the computing environment, memory usage levels, latency levels, application usage, and processor utilization levels.

The system obtains autosave triggers and corresponding autosave trigger values for autosave triggers (Operation 204). The autosave triggers include triggers that have historically been implemented in the computing environment. Each autosave trigger is defined by a set of conditions that determine whether the autosave operation executes and what data is saved by the autosave operation. The value metric is a metric that represents the value of an autosave trigger relative to other autosave triggers. The value metric may be represented as any value along any predetermined scale, such as a value on a scale from 0 (lowest value) to (100) highest value. Alternatively, the value metric may be a binary value or a classification label.

The system determines whether the autosave trigger value for a respective autosave trigger is provided by an external source (Operation 206). If the system determines that the autosave trigger value is set by an external source, the system sets the autosave trigger value to the value set by the external source (Operation 208). In one embodiment, a user may assign autosave trigger values to different autosave triggers in a list of autosave triggers. In another embodiment, autosave trigger values may be obtained from sets of autosave trigger values used in similar data environments. In yet another embodiment, a user may be provided with information about particular autosave triggers including a cost metric value associated with the autosave trigger and a benefit metric value associated with the autosave trigger. The cost metric value may represent a cost to implement the autosave trigger in a computing environment. The benefit metric value may represent a benefit of implementing the autosave trigger in the computing environment. The user may designate a particular autosave trigger value to the autosave trigger based on the cost metric value and benefit metric value of the autosave trigger. Alternatively, a user may be prompted to place a value on particular costs and particular benefits. For example, the user may assign a greater cost metric value to an autosave operation that interrupts another application than to an autosave operation that does not interrupt other applications. The user may assign a greater benefit metric value to an autosave operation that consumes fewer processing resources than to an autosave operation that consumes more processing resources. However, in another computing environment, another user may assign a lower cost metric value for the autosave trigger that interrupts other applications. Accordingly, embodiments encompass customizable cost/benefit metric values and customizable autosave trigger values based on different priorities of users and operators.

If the system determines that the autosave trigger value is not provided by an external source, the system performs its own cost/benefit analysis to generate an autosave trigger value for an autosave trigger (Operation 210). For example, the system may store one or more tables that associate different costs, such as the amount of processor bandwidth consumed by an autosave operation of an autosave trigger, with different cost metrics. An autosave trigger that utilizes less processing bandwidth each time a corresponding autosave is executed may be assigned a relatively lower cost metric value than an autosave operation that utilizes more processing bandwidth. A table may also associate particular benefits with corresponding benefit metric values. For example, an autosave trigger having a higher access rate, indicating a frequency with which data saved in an autosave operation associated with the autosave trigger is later accessed to restore the data, may have a higher benefit metric value than an autosave trigger having a lower access rate. The system may generate an autosave trigger value for each autosave trigger based on a combination of cost metric values and benefit metric values associated with the autosave triggers.

The system trains a machine learning model, using the obtained data attributes and environmental attributes, the historically-implemented autosave triggers, and the obtained autosave trigger values (Operation 212). The machine learning model learns the associations between the data attributes and environmental attributes and the respective autosave trigger values. As a result, the machine learning model learns to generate a particular autosave trigger value for particular sets of autosave trigger conditions implemented in a computing environment having particular data attributes and particular environmental attributes.

The system obtains a target autosave trigger (Operation 214). The target autosave trigger has particular conditions. For example, one autosave trigger may be configured to execute an autosave operation any time a user switches from one window in a GUI to another window. Another autosave trigger may be configured to execute an autosave operation after a user has performed ten operations, such as generating ten lines of code, without performing any intervening data save operations. The target autosave trigger may be obtained from a list of previously-executed autosave triggers. Alternatively, a user may generate a customized autosave trigger. According to yet another alternative, an autosave trigger may be imported to one application suite or computing environment from another application suite or computing environment.

The system applies the machine learning model to the target autosave trigger to generate an autosave trigger value score for the autosave trigger (Operation 216). For example, the target autosave trigger may specify that an autosave operation is executed when a particular data condition is detected indicating an imminent loss of data. The model, which was previously trained to identify the relationships among data attributes and environmental attributes, generates a particular autosave trigger value for the target autosave trigger.

The system applies autosave triggers in a computing environment based on the autosave trigger values generated by the machine learning model (Operation 218). For example, the system may compare the autosave trigger value to a threshold value and apply the autosave trigger in the computing environment only when the autosave trigger value exceeds the threshold. In addition, or in the alternative, the system may compute autosave trigger values for a list of ten autosave triggers and may apply only the three autosave triggers having the highest values in the computing environment. In yet another embodiment, the system displays a list of ranked autosave triggers on a GUI and receives a selection indicating which autosave triggers to implement in a computing environment.

While FIG. 2 illustrates an embodiment in which the machine learning model is trained to generate an autosave trigger value of an autosave, in an alternative embodiment, the machine learning model is trained to generate a cost metric value and a benefit metric value of the computing environment. The machine learning model generates at least one of the cost or the benefit based on real-time conditions detected by the system. In an example, the system may compute cost by identifying an effect of autosave operations on a set of applications currently being executed by the system. In yet another embodiment, the system executes a real-time cost/benefit analysis for an autosave operation. The system then provides a value corresponding to the cost/benefit analysis to the machine learning model to generate the autosave trigger value.

According to yet another embodiment, the system may compute a value score for a target trigger without the application of a machine learning model. The system may compute the value score for a target trigger for autosave operations based on a cost/benefit analysis, as described above. If the value score meets a threshold value, the system configures the execution of autosave operations whenever conditions, corresponding to the target trigger, are detected.

One or more operations illustrated in FIG. 2 may be modified, rearranged, or omitted all together. Accordingly, the particular sequence of operations illustrated in FIG. 2 should not be construed as limiting the scope of one or more embodiments.

Figure 3:
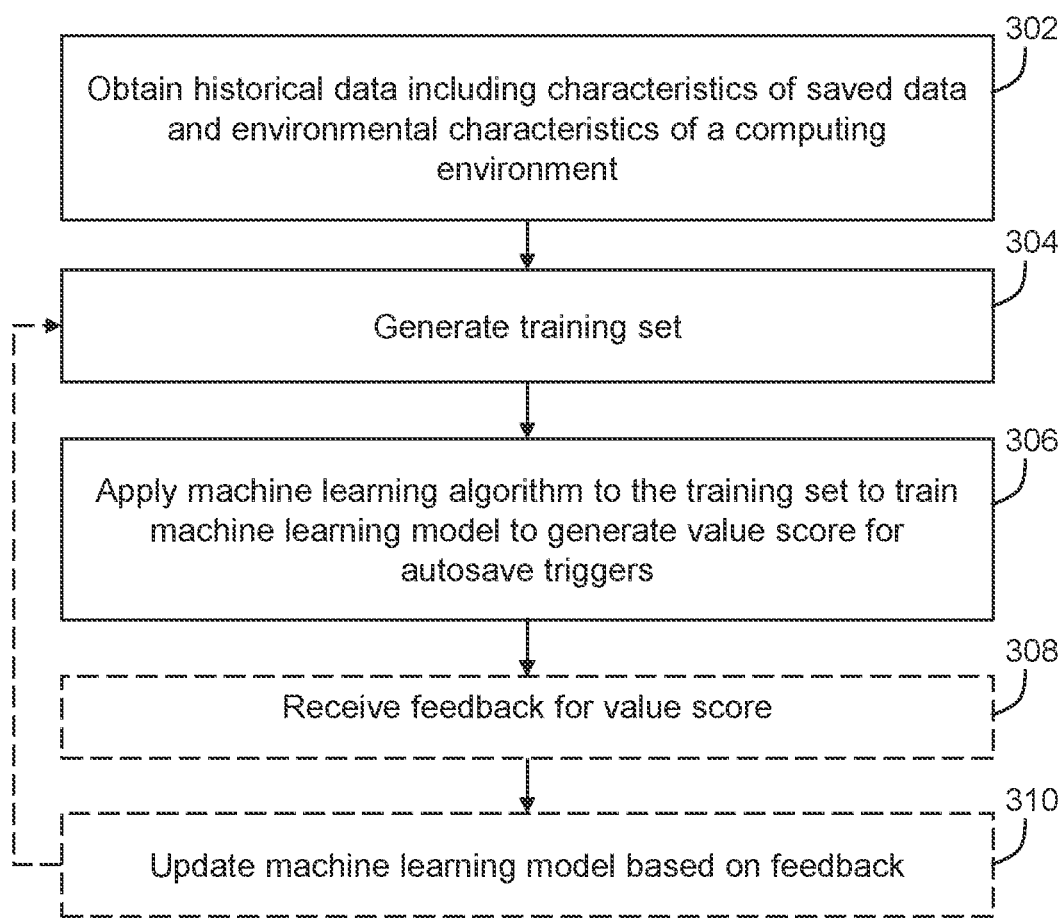
FIG. 3 illustrates an example set of operations for training a machine learning model to identify a value metric for an autosave trigger in accordance with one or more embodiments.

4. Training a Machine Learning Model to Generate an Autosave Value Score for an Autosave Trigger FIG. 3 illustrates an example set of operations for training a machine learning model to generate an autosave value score for an autosave trigger in accordance with one or more embodiments.

A system obtains historical data including characteristics of saved data and environmental characteristics of a computing environment (Operation 302). The historical data also includes autosave triggers and value scores associated with the autosave triggers. The autosave triggers specify conditions that trigger the autosave triggers. The conditions include, for example, particular combinations of environmental characteristics. In one embodiment, the autosave trigger value is based on a cost metric value associated with an autosave trigger and a benefit metric value associated with the autosave trigger.

The system generates a training data set from the historical data (Operation 304). The training data set includes, for each set of autosave trigger conditions, a corresponding autosave trigger value.

The system applies a machine learning algorithm to the training data set to train the machine learning model to generate an autosave trigger value score for particular autosave triggers having particular trigger conditions (Operation 306). In one embodiment, training the machine learning model includes applying an input vector from the training data set to a neural network, obtaining an output value, comparing the output value to a value in the training set, and adjusting parameters of the neural network based on a difference between the value output from the machine learning model and the value identified in the training set.

In one embodiment, training the machine learning model includes receiving feedback for a value score generated by the machine learning model (Operation 308). For example, the system may display a set of autosave trigger value scores generated by the machine learning model on a GUI. The system may receive one or more inputs to alter one or more value scores. The system updates the machine learning model based on the feedback (Operation 310).

One or more operations illustrated in FIG. 3 may be modified, rearranged, or omitted all together. Accordingly, the particular sequence of operations illustrated in FIG. 3 should not be construed as limiting the scope of one or more embodiments.

Figure 4:
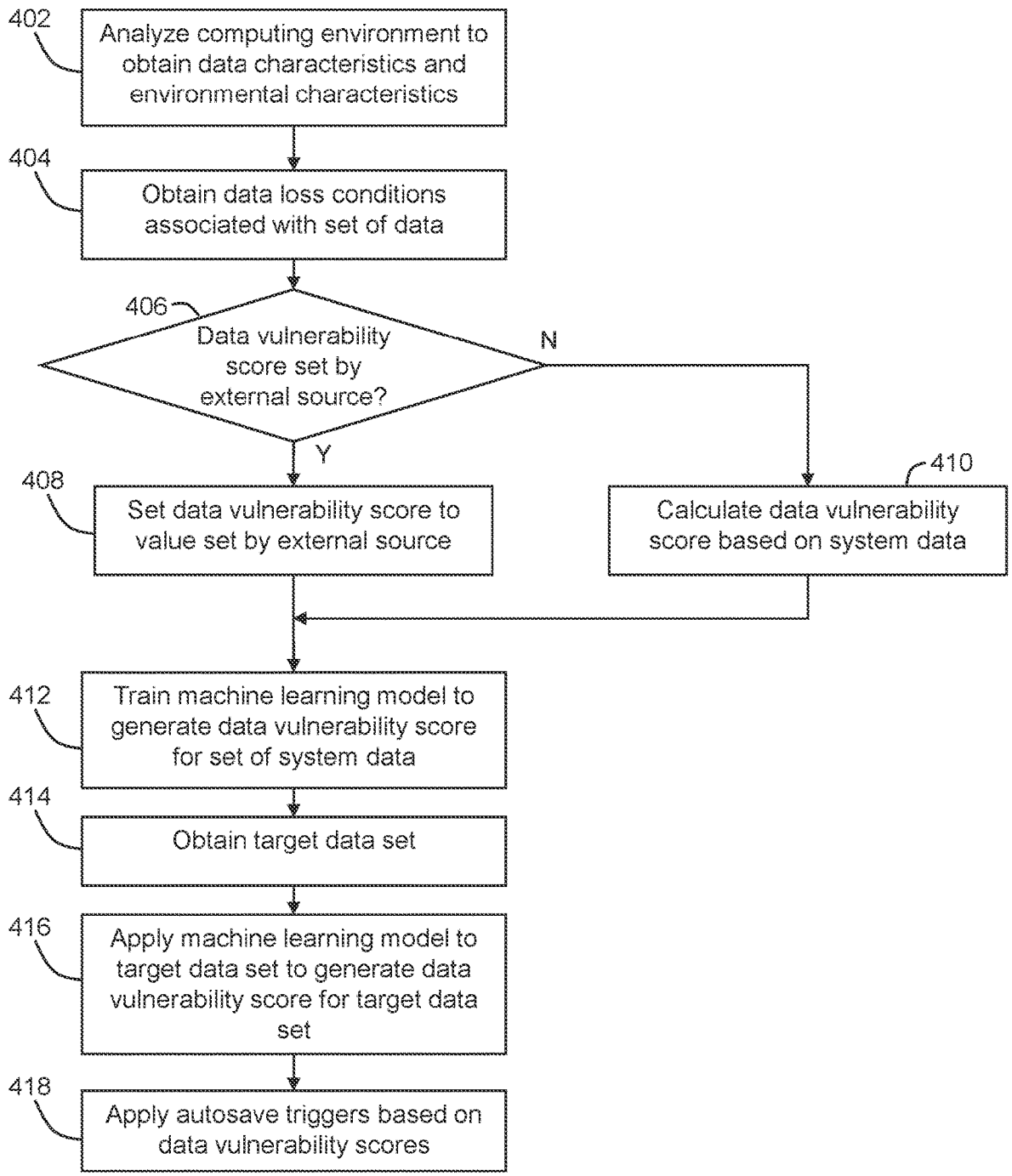
FIG. 4 illustrates an example set of operations for identifying how vulnerable a particular set of data is to data loss in accordance with one or more embodiments.

5. Applying an Autosave Trigger in a System Based on a Data Vulnerability Score FIG. 4 illustrates an example set of operations for applying a machine learning model to a set of data to generate a vulnerability score associated with the set of data in accordance with one or more embodiments. One or more operations illustrated in FIG. 4 may be modified, rearranged, or omitted all together. Accordingly, the particular sequence of operations illustrated in FIG. 4 should not be construed as limiting the scope of one or more embodiments.

A system obtains data characteristics and environmental characteristics of a computing environment (Operation 402). Data characteristics and environmental characteristics include types of data generated by, and stored in, the computing environment, whether data is accessed frequently or seldom, and what were the environment and data conditions during the data loss event.

The system obtains data loss conditions associated with a set of data (Operation 404). In particular, the system identifies a set of attributes, including the data characteristics and environmental characteristics, associated with a set of data. The system may determine that the set of data is generated by a particular application, by a particular process, at a certain point in a sequence of processes, that the data is of a particular type, or stored in a particular location in memory or in a certain memory device. The system identifies, in the data of the computing environment, a data loss event. The system determines the conditions associated with the set of data in the data loss event. For example, the system identifies whether any data in the data set was lost, how much data may have been lost, what type of data may have been lost, when the data set was last auto-saved, what were power levels what computing components failed, what were power levels of computing components, as well as any other environmental and data conditions associated with the data loss event.

Based on the data loss conditions, the system assigns a data vulnerability score to the data set. The system determines whether a data vulnerability score has been assigned to the data set from an external source (Operation 406). If the system determines that a data vulnerability score is set by an external source, the system sets the data vulnerability score for the data set according to the value indicated by the external source (Operation 408). In one embodiment, a user may assign a data vulnerability score to a set of data having particular attributes. In another embodiment, the data vulnerability score may be obtained based on scores of similar data sets in similar data environments. In yet another embodiment, a user may be provided with information a particular data set, such as an application that generated the data set, and the user may or generate a data vulnerability score based on the provided information.

If the system determines that data vulnerability score is not provided by an external source, the system may generate a data vulnerability score for the data set (Operation 410). For example, the system may store one or more tables that identify different computing environment conditions associated with data loss events. The system may assign a particular data vulnerability score to a particular data set based on how many of the environment conditions associated with a data loss event apply to the data set. For example, if the likelihood of a system crash increases at a particular temperature, when a particular application is running, or at a particular time of day, the system may determine how many of the conditions apply to the data set and generate a corresponding data vulnerability score.

The system trains a machine learning model using (a) data attributes of data sets, including data characteristics and environmental characteristics associated with the data sets, and (c) the obtained data vulnerability score (Operation 412). The machine learning model learns the associations between the data characteristics and environmental characteristics and the respective data vulnerability scores. As a result, the machine learning model learns to generate a data vulnerability score for particular data sets according to data attributes associated with the data sets.

Upon training the machine learning model, the system obtains data attributes of a target data set (Operation 414). The system applies the trained machine learning model to the data attributes associated with the target data set to generate a data vulnerability score for the target data set (Operation 416). The data vulnerability score represents a quantitative value of the likelihood that the data in the target data set will be lost in a data loss event.

Based on the data vulnerability score, the system applies an autosave trigger in the computing environment (Operation 418). For example, if the data vulnerability score is high for a particular set of data, the system may implement more costly autosave triggers in the system to prevent data loss. For example, the system may implement autosaves that are triggered more frequently than for data sets associated with a lower data vulnerability score. In one embodiment, the system may select a subset of autosave triggers from among a set of autosave triggers, based on the data vulnerability score. In one embodiment, the system may display the data vulnerability score for a user, and a user may select one or more autosave triggers to implement in the computing environment.

6. Example Embodiment: Generating Autosave Policies for a Computing Environment A detailed example is described below for purposes of clarity. Components and/or operations described below should be understood as one specific example which may not be applicable to certain embodiments. Accordingly, components and/or operations described below should not be construed as limiting the scope of any of the claims.

Figure 5:
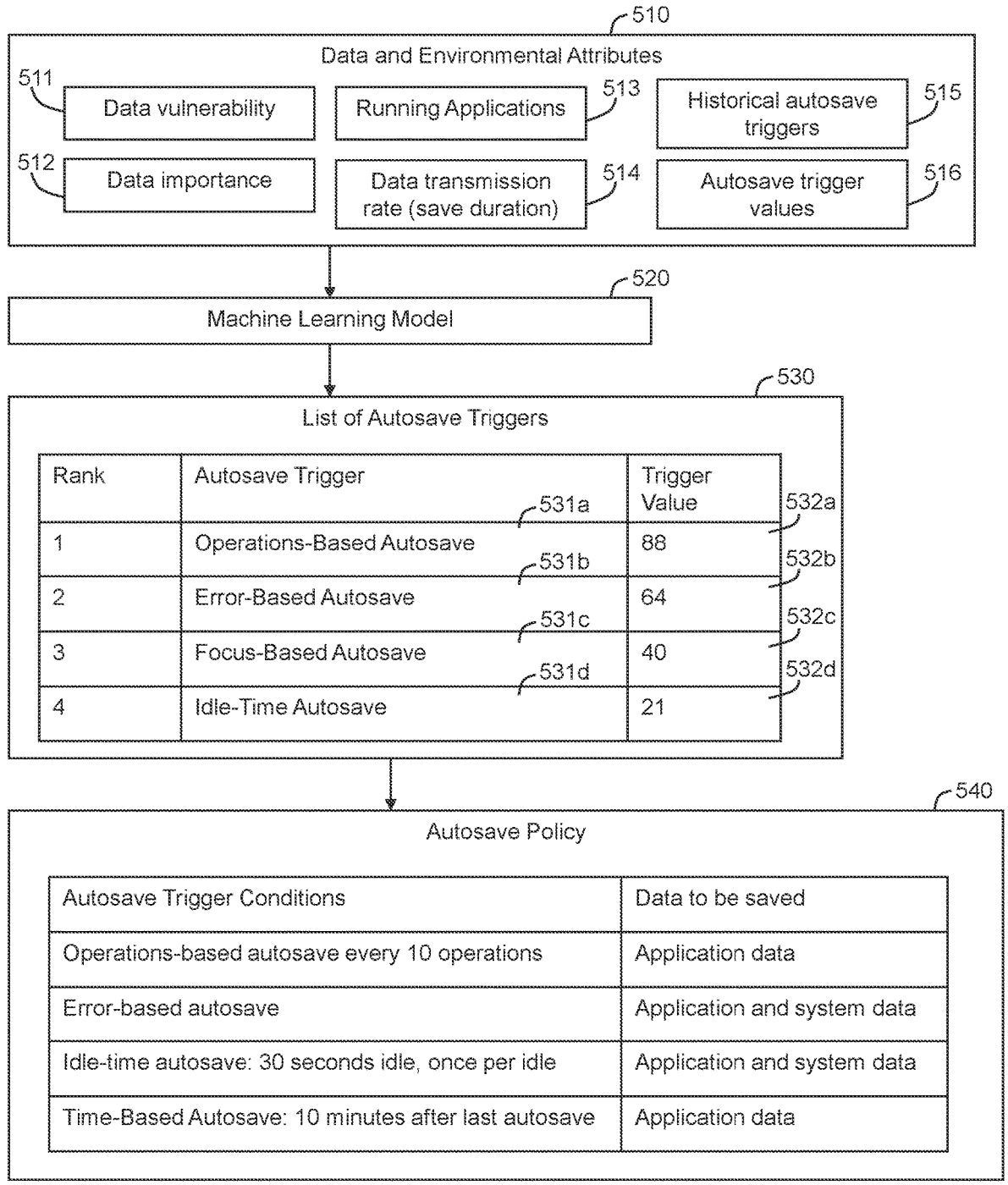
FIG. 5 illustrates an example embodiment of selecting one or more autosave triggers for an environment based on value scores.

FIG. 5 illustrates an example embodiment of generating autosave trigger values and generating autosave policies for a computing environment based on the autosave trigger values. The system obtains data and environmental attributes 510 of a computing environment. The data and environmental attributes include attributes 511 describing the data vulnerability of one or more sets of data, attributes 512 describing an importance of one or more sets of data, attributes 513 of applications running in the computing environment, and attributes 514 describing data transmission rates and durations of saves in the computing environment.

The system trains a machine learning model 520 based on the data and environmental attributes 510, based on historical autosave triggers 515 implemented in the computing environment, and based on autosave trigger values 516 associated with the historical autosave triggers. The historical autosave triggers 515 specify conditions, such as particular data and environmental attributes, that trigger an autosave operation. The historical autosave triggers 515 also specify what data is saved in a corresponding autosave operation. The autosave trigger values 516 may be based on a cost/benefit metric for a corresponding autosave operation. For example, a higher autosave trigger value may be designated for an autosave operation that utilizes fewer resources in the computing environment than an autosave operation that utilizes more resources in the computing environment. In addition, a higher autosave trigger value may be designated for an autosave operation that is determined to save more unique data, not saved by any other autosave operation, than an autosave operation that saves less unique data.

Upon being trained, autosave triggers 531a-531d are provided to the machine learning model 520. The machine learning model generates autosave trigger values 532a-532d for the respective autosave triggers 531a-531d. In one embodiment, a set of ten autosave triggers are provided to the machine learning model 520, and the system stores only the four highest ranked autosave triggers 531a-531d.

The system receives input based on the list 530 of autosave triggers to generate an autosave policy 540. The autosave policy 540 identifies (a) which autosave triggers to implement in the computing environment, (b) what conditions will be applied to the autosave triggers, such as at what frequency the autosave triggers will be triggered, and (c) what data will be saved by the autosave operations associated with the autosave triggers. In the example illustrated in FIG. 5, the autosave policy 540 implements the operations-based autosave trigger 531a to save application data after very 10 operations in the application. The autosave policy 540 implements the error-based autosave trigger 531b upon detecting conditions indicating an error is imminent to save both application and system data. The autosave policy 540 implements the idle-time based autosave trigger 531d to save application and system data when a user has been idle for 30 seconds, and the autosave is triggered only once per idle period. The autosave policy 540 implements a time-based autosave trigger 10 minutes after the last autosave to save only application data. The autosave policy 540 does not implement a focus-based autosave trigger 531c.

While FIG. 5 illustrates an example in which the autosave triggers included in the autosave policy 540 are different than the ranked autosave triggers in the list of autosave triggers 530, in one or more embodiments, the system may automatically generate an autosave policy 540 that includes each of the highest ranked autosave triggers. In addition, the system may automatically configure conditions of the autosave triggers according to their respective ranks. For example, the system may configure the operations-based autosave trigger 531a, having an autosave trigger value of 88, to execute more frequently than the idle-time-based autosave trigger 531d having an autosave trigger value of 21.

As illustrated in FIG. 5, the autosave policy 540 is configurable to (a) include/exclude particular autosave triggers, (b) configure the conditions that trigger each autosave trigger, and (c) configure the data to be saved as a result of an autosave operation corresponding to an autosave trigger. In one embodiment, the system generates a default autosave policy 540 based on the ranked list of autosave triggers 530. A user may then configure the various parameters of the autosave policy 540 according to the user preferences for implementing autosave triggers in a computing environment.

7. Example Embodiment: Generating an Autosave Data Retention Policy Based on Autosave Trigger Value Scores A detailed example is described below for purposes of clarity. Components and/or operations described below should be understood as one specific example which may not be applicable to certain embodiments. Accordingly, components and/or operations described below should not be construed as limiting the scope of any of the claims.

Figure 6:
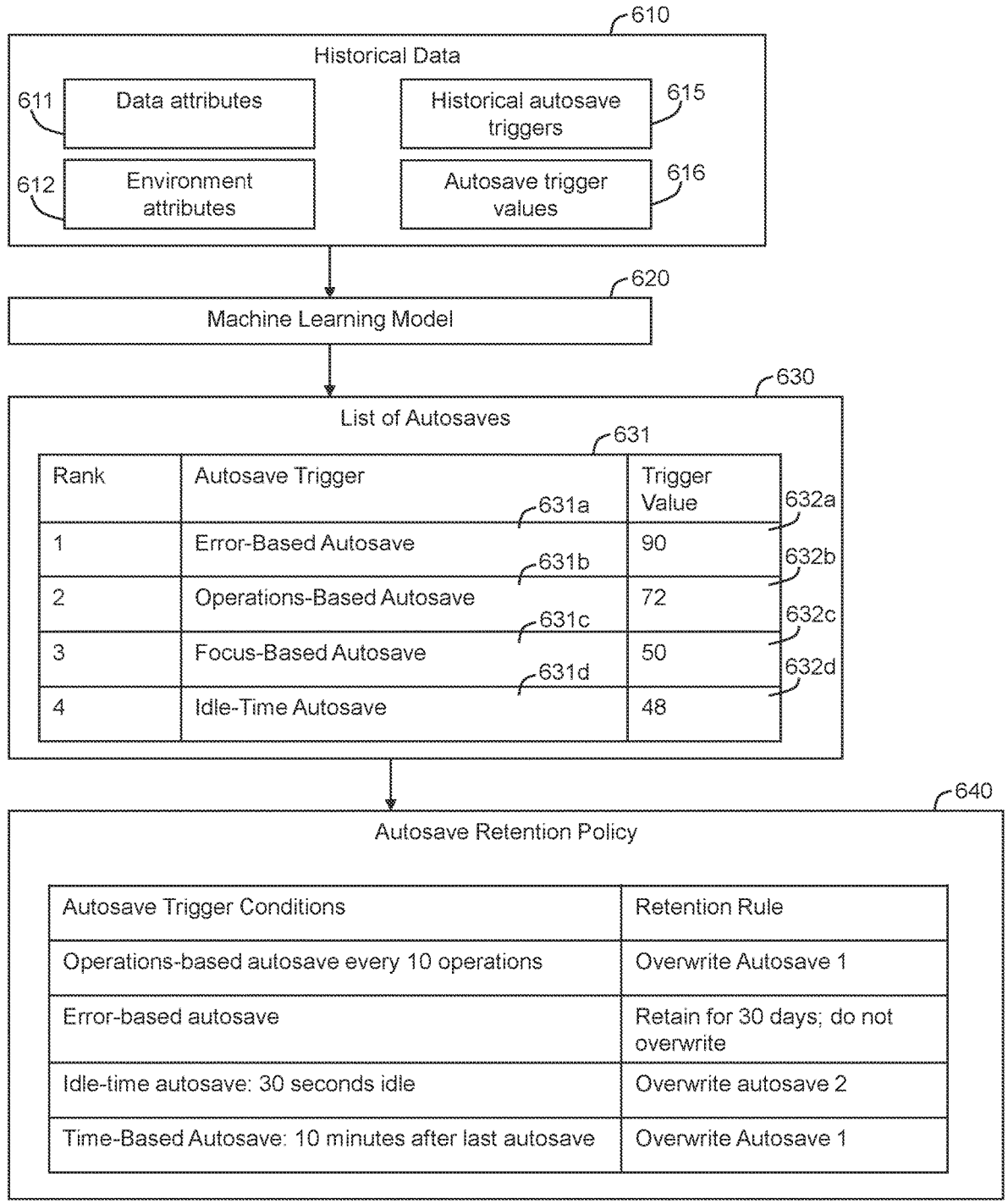
FIG. 6 illustrates an example embodiment of generating a data retention policy based on value scores of autosave triggers.

FIG. 6 illustrates an example embodiment of generating an autosave data retention policy based on autosave trigger values. The system obtains historical data 610 including data attributes 611 and environmental attributes 612 of a computing environment. Data attributes 611 include an amount of data stored, an access rate of the stored data, a type of the data stored, an importance of the stored data, a data vulnerability score of the data, and locations in the computing environment where the data is stored. Environmental attributes 612 include transmission rates of components in the computing environment, power information, temperature information, component types, data storage capacity, and other component characteristics. The historical data 610 also includes historical autosave triggers 615 implemented in the computing environment and historical autosave trigger values 616 associated with the historical autosave triggers 615.

The system trains a machine learning model 620 based on the data and environmental attributes 611, 612, based on the historical autosave triggers 615 implemented in the computing environment, and based on the autosave trigger values 616 associated with the historical autosave triggers 615. The historical autosave triggers 615 specify conditions, such as particular data and environmental attributes, that trigger an autosave operation. The historical autosave triggers 615 also specify what data is saved in a corresponding autosave operation. The autosave trigger values 616 may be based on a cost/benefit metric for a corresponding autosave operation. For example, a higher autosave trigger value may be designated for an autosave operation that utilizes fewer resources in the computing environment than an autosave operation that utilizes more resources in the computing environment. In addition, a higher autosave trigger value may be designated for an autosave operation that is determined to save more unique data, not saved by any other autosave operation, than an autosave operation that saves less unique data.

Upon being trained, autosave triggers 631a-631d are provided to the machine learning model 620. The machine learning model generates autosave trigger values 632a-632d for the respective autosave triggers 631a-631d. In one embodiment, a set of ten autosave triggers 631 is provided to the machine learning model 620, and the system stores only the four highest ranked autosave triggers 631a-631d.

The system receives input based on the list 630 of autosave triggers to generate an autosave retention policy 640. The autosave retention policy 640 identifies particular autosave triggers and data retention rules for the data saved by the particular autosave triggers. In the example of FIG. 6, the autosave retention policy 640 includes a rule to over-write data, named "Autosave 1," saved by an operations-based autosave trigger 631b. The autosave retention policy 640 includes a rule to retain data saved by an error-based autosave trigger 631a for 30 days and to not over-write the data for the 30 days. The autosave retention policy 640 includes a rule to overwrite data, named "Autosave 2," saved by an idle-time autosave trigger 631d. The autosave retention policy 640 includes a rule to overwrite the data, named "Autosave 1," saved by a time-based autosave trigger. As illustrated in FIG. 6, the autosave retention policy is configurable to (a) specify which autosave triggers are assigned particular retention policies, (b) specify a frequency of over-writing saved data saved by each autosave trigger, and (c) specify which data is to be over-written by an autosave. For example, the operations-based autosave trigger 631b and the time-based autosave trigger are configured to save data to the same location and over-write the data at the same location. However, the idle-time autosave trigger 631d may be configured to save data to a different location than any other autosave trigger and to save different types of data than other autosave triggers.

While FIG. 6 illustrates an example in which the autosave triggers associated with the autosave retention policy 640 are different than the ranked autosave triggers 631 in the list of autosave triggers 630, in one or more embodiments, the system may automatically set default autosave policies for each of the highest ranked autosave triggers. In addition, the system may automatically configure the autosave retention policies to give priority to higher-ranked autosave triggers. For example, the system may indicate that the error-based autosave trigger 631a may over-write data saved by any of the lower-ranked autosave triggers 631b-631d, but that the idle-time based autosave trigger 631d may not over-write data saved by any of the higher ranked autosave triggers 631a-631d. In another embodiment, the system may automatically assign an autosave trigger having an autosave value above a threshold level to save data to a location different from every other autosave trigger. For example, the system may determine that any autosave trigger having an autosave trigger value above 70 saves data to a unique data location that is not over-written by any other autosave triggers. In contrast, the system may determine that any autosave trigger having an autosave trigger value of 70 or below saves data to a same location in memory, and the autosave triggers over-write each other.

8. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants.

In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

8. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 7:
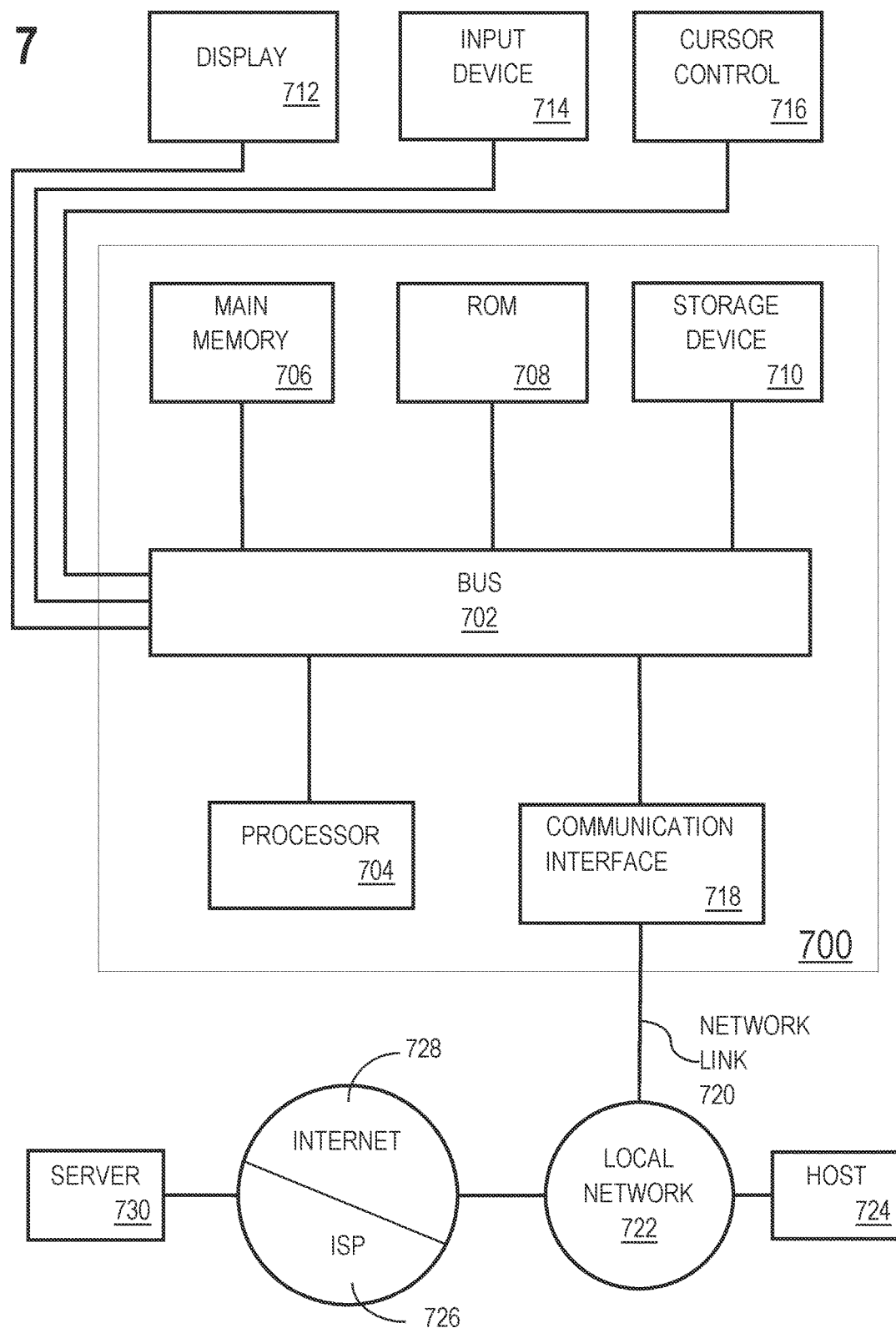
FIG. 7 shows a block diagram that illustrates a computer system in accordance with one or more embodiments.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:
    training a machine learning model to generate a value score for a target trigger of autosave operations,
    wherein training the machine learning model comprises:
        obtaining training data sets of historical autosave information, each training data set comprising:
            conditions corresponding to a particular trigger of autosave operations, the conditions comprising one or more of:
                characteristics of data saved by the autosave operations corresponding to the particular trigger;
                environmental characteristics associated with a computing environment used to access the data when the data was saved by the autosave operations corresponding to the particular trigger;
            a particular value score assigned to the particular trigger of autosave operations;
        training the machine learning model based on the training data sets;
    applying the machine learning model to conditions defined by the target trigger of autosave operations to compute the value score for the target trigger of autosave operations;
    determining whether the value score for the target trigger of autosave operations meets a threshold value;
    responsive to determining that the value score for the target trigger of autosave operation meets the threshold value, configuring a system to execute an autosave operation when the conditions defined by the target trigger are detected.

2. The medium of claim 1, wherein the particular value score is based on a ratio of a cost metric to a benefit metric.

3. The medium of claim 2, wherein the benefit metric includes an access rate of the particular trigger of autosave operations, wherein the access rate represents a ratio between a number of times the particular trigger is triggered to save data and a number of times the data saved as a result of the particular trigger is accessed to restore the data.

4. The medium of claim 2, wherein the benefit metric is based on at least one of:
    a unique data value representing an amount of unique data saved as a result of the autosave that was not saved as a result of any other autosave;
    a gross data value representing a total amount of the data saved as a result of the autosave;
    an importance value representing a level of importance of the data saved as a result of the autosave;
    a vulnerability value representing a vulnerability to a data loss event of the data saved as a result of the autosave.

5. The medium of claim 2, wherein the cost metric is based on at least one of:
    a processing time required to complete the target autosave;
    an amount of computing resources required to complete the target autosave;
    a frequency of the target autosave;

an interruption time representing a time during which the target autosave interrupts one or more other processes to save the data.

6. The medium of claim 1, wherein the target trigger is a trigger for at least one of:
an error-based autosave that: (1) detects an error, (2) identifies a state of the data immediately prior to the error, and (3) saves the state of the data immediately prior to the error;
a session-expiry autosave that saves the data based on detecting an expiration time of a session;
an idle-time autosave that saves the data based on detecting an idle state of a program accessing the data;
a focus-based autosave that saves the data based on detecting a change of focus from one application displayed on a graphical user interface (GUI) to another application displayed on the GUI;
an operations-based autosave that saves the data based on detecting performance of a predetermined number of operations;
an environment-based autosave that saves the data based on detecting at least one of:
a power fluctuation;
a threshold temperature;
a threshold memory usage value;
a threshold latency value.

7. The medium of claim 1, wherein the operations further comprise:
applying the machine learning model to new conditions defined by a new target trigger of autosave operations to compute a new value score for the new target trigger of autosave operations;
determining whether the new value score for the new target trigger of autosave operations meets the threshold value;
responsive to determining that the new value score for the new target trigger of autosave operation does not meet the threshold value, configuring the system to refrain from executing an autosave operation when the new conditions defined by the new target trigger are detected.

8. A method, comprising:
training a machine learning model to generate a value score for a target trigger of autosave operations,
wherein training the machine learning model comprises:
obtaining training data sets of historical autosave information, each training data set comprising:
conditions defined by a particular trigger of autosave operations, the conditions comprising one or more of:
characteristics of data saved by the autosave operations corresponding to the particular trigger;
environmental characteristics associated with a computing environment used to access the data saved by the autosave operations corresponding to the particular trigger;
a particular value score assigned to the particular trigger of autosave operations;
training the machine learning model based on the training data sets;
applying the machine learning model to conditions defined by the target trigger of autosave operations to compute the value score for the target trigger of autosave operations;
determining whether the value score for the target trigger of autosave operations meets a threshold value;
responsive to determining that the value score for the target trigger of autosave operation meets the threshold value, configuring a system to execute an autosave operation when the conditions defined by the target trigger are detected.

9. The method of claim 8, wherein the particular value score is based on a ratio of a cost metric to a benefit metric.

10. The method of claim 9, wherein the benefit metric includes an access rate of the particular trigger of autosave operations, wherein the access rate represents a ratio between a number of times the particular trigger is triggered to save data and a number of times the data saved as a result of the particular trigger is accessed to restore the data.

11. The method of claim 9, wherein the benefit metric is based on at least one of:
a unique data value representing an amount of unique data saved as a result of the autosave that was not saved as a result of any other autosave;
a gross data value representing a total amount of the data saved as a result of the autosave;
an importance value representing a level of importance of the data saved as a result of the autosave;
a vulnerability value representing a vulnerability to a data loss event of the data saved as a result of the autosave.

12. The method of claim 9, wherein the cost metric is based on at least one of:
a processing time required to complete the target autosave;
an amount of computing resources required to complete the target autosave;
a frequency of the target autosave;
an interruption time representing a time during which the target autosave interrupts one or more other processes to save the data.

13. The method of claim 8, wherein the target trigger is a trigger for at least one of:
an error-based autosave that: (1) detects an error, (2) identifies a state of the data immediately prior to the error, and (3) saves the state of the data immediately prior to the error;
a session-expiry autosave that saves the data based on detecting an expiration time of a session;
an idle-time autosave that saves the data based on detecting an idle state of a program accessing the data;
a focus-based autosave that saves the data based on detecting a change of focus from one application displayed on a graphical user interface (GUI) to another application displayed on the GUI;
an operations-based autosave that saves the data based on detecting performance of a predetermined number of operations;
an environment-based autosave that saves the data based on detecting at least one of:
a power fluctuation;
a threshold temperature;
a threshold memory usage value;
a threshold latency value.

14. The method of claim 8, further comprising:
applying the machine learning model to new conditions defined by a new target trigger of autosave operations to compute a new value score for the new target trigger of autosave operations;
determining whether the new value score for the new target trigger of autosave operations meets the threshold value;
responsive to determining that the new value score for the new target trigger of autosave operation does not meet the threshold value, configuring the system to refrain from executing an autosave operation when the new conditions defined by the new target trigger are detected.

15. A system, comprising:
one or more processors; and
memory storing instructions that, when executed by the one or more processors, cause the system to perform:
training a machine learning model to generate a value score for a target trigger of autosave operations,
wherein training the machine learning model comprises:
  obtaining training data sets of historical autosave information, each training data set comprising:
    conditions defined by a particular trigger of autosave operations, the conditions comprising one or more of:
      characteristics of data saved by the autosave operations corresponding to the particular trigger;
      environmental characteristics associated with a computing environment used to access the data saved by the autosave operations corresponding to the particular trigger;
    a particular value score assigned to the particular trigger of autosave operations;
  training the machine learning model based on the training data sets;
applying the machine learning model to conditions defined by the target trigger of autosave operations to compute the value score for the target trigger of autosave operations;
determining whether the value score for the target trigger of autosave operations meets a threshold value;
responsive to determining that the value score for the target trigger of autosave operation meets the threshold value, configuring a system to execute an autosave operation when the conditions defined by the target trigger are detected.

16. The system of claim 15, wherein the particular value score is based on a ratio of a cost metric to a benefit metric.

17. The system of claim 16, wherein the benefit metric includes an access rate of the particular trigger of autosave operations, wherein the access rate represents a ratio between a number of times the particular trigger is triggered to save data and a number of times the data saved as a result of the particular trigger is accessed to restore the data.

18. The system of claim 16, wherein the benefit metric is based on at least one of:
a unique data value representing an amount of unique data saved as a result of the autosave that was not saved as a result of any other autosave;
a gross data value representing a total amount of the data saved as a result of the autosave;
an importance value representing a level of importance of the data saved as a result of the autosave;
a vulnerability value representing a vulnerability to a data loss event of the data saved as a result of the autosave.

19. The system of claim 16, wherein the cost metric is based on at least one of:
a processing time required to complete the target autosave;
an amount of computing resources required to complete the target autosave;
a frequency of the target autosave;
an interruption time representing a time during which the target autosave interrupts one or more other processes to save the data.

20. The system of claim 15, wherein the target trigger is a trigger for at least one of:
an error-based autosave that: (1) detects an error, (2) identifies a state of the data immediately prior to the error, and (3) saves the state of the data immediately prior to the error;
a session-expiry autosave that saves the data based on detecting an expiration time of a session;
an idle-time autosave that saves the data based on detecting an idle state of a program accessing the data;
a focus-based autosave that saves the data based on detecting a change of focus from one application displayed on a graphical user interface (GUI) to another application displayed on the GUI;
an operations-based autosave that saves the data based on detecting performance of a predetermined number of operations;
an environment-based autosave that saves the data based on detecting at least one of:
  a power fluctuation;
  a threshold temperature;
  a threshold memory usage value;
  a threshold latency value.

21. The system of claim 15, further comprising:
applying the machine learning model to new conditions defined by a new target trigger of autosave operations to compute a new value score for the new target trigger of autosave operations;
determining whether the new value score for the new target trigger of autosave operations meets the threshold value;
responsive to determining that the new value score for the new target trigger of autosave operation does not meet the threshold value, configuring the system to refrain from executing an autosave operation when the new conditions defined by the new target trigger are detected.

* * * * *